(12) United States Patent
Cambon (10) Patent No.: US 6,409,123 B2
(45) Date of Patent: *Jun. 25, 2002

(54) AIRCRAFT WING STRUCTURE PROFILED SUSPENSION PYLON

(75) Inventor: Jean-Louis Cambon, La Salvetat Saint Gilles (FR)

(73) Assignee: Eads Airbus SA, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/798,918

(22) Filed: Mar. 6, 2001

(30) Foreign Application Priority Data

Apr. 10, 2000 (FR) .......................................... 00 04561

(51) Int. Cl.$^7$ ................................................. B64C 1/38
(52) U.S. Cl. ........................................ 244/130; 244/54
(58) Field of Search ..................... 244/54, 124, 130, 244/55, 536, 53 R; D12/340, 341

(56) References Cited

U.S. PATENT DOCUMENTS 3,960,345 A * 6/1976 Lippert, Jr. ................. 244/130
4,067,518 A   1/1978 Paterson
4,712,750 A   12/1987 Ridgwell
4,867,394 A   9/1989 Patterson
5,102,069 A * 4/1992 Hackett et al. ............... 244/54

FOREIGN PATENT DOCUMENTS

EP    0432972    6/1991

OTHER PUBLICATIONS

French International Search Report dated Sep. 1, 2000.

* cited by examiner

*Primary Examiner*—Peter M. Poon
*Assistant Examiner*—Timothy D Collins
(74) *Attorney, Agent, or Firm*—Stevens, Davis, Miller & Mosher, LLP

(57) ABSTRACT

According to the invention, the suspension pylon (3) comprises a fairing for reducing the local loss in lift (8) and its maximum-width section (7) is located at the front of the concave and set-back rear part (4R) of the pressure face (4) of the wing structure (1). The fairing for reducing the local loss in lift (8):

is housed, at least over most of its height, in the concavity of the rear part (4R) of the pressure face (4) of the wing structure (1), and widens laterally toward the rear; and comprises a projecting rear part (12) that tapers toward the rear and ends in an aerodynamic trailing edge (16) the length of which is very long by comparison with the maximum width of the fairing.

7 Claims, 6 Drawing Sheets

AIRCRAFT WING STRUCTURE PROFILED SUSPENSION PYLON

BACKGROUND OF THE INVENTION

The present invention relates to an aircraft wing structure profiled suspension pylon.

It is known that certain aircraft comprise profiled pylons suspended from their wing structure and projecting from the pressure face thereof. Such pylons are intended for suspending devices such as engines, weaponry, fuel tanks, etc., under the wing structure.

Naturally, these pylons and the devices suspended from them give rise to disturbances in the aerodynamic flow over the wing structure and this locally results in a loss of lift and an increase in drag. These unfavorable aerodynamic effects are moreover worsened because, for structural reasons in particular, said pylons are, on the one hand, relatively wide and, on the other hand, have their trailing edge in the vicinity of the trailing edge of the wing structure, such trailing-edge proximity increasing the risks of airstream detachment.

DESCRIPTION OF THE PRIOR ART

To overcome these drawbacks, the airbus A320 has, from as early as 1986, been using a fairing for reducing the local loss in aerodynamic lift due to such a suspension pylon. A fairing of the same type (which is described, for example, in EP-A-0 432 972) is arranged in contact with the pressure face of said wing structure and extends, on the one hand, heightwise, over part of said pylon and, on the other hand, toward the rear of the wing, as a continuation beyond the trailing edge thereof. A known fairing such as this has the approximate shape of a right parallelepiped ending at the rear in a rounded-vertex pyramid. The upper surface of the fairing, projecting beyond the trailing edge of the wing structure, continues the suction face thereof and the width of said fairing corresponds to the maximum width of said pylon, which means that the lateral faces of said fairing extend the maximum-width section of said pylon rearward.

For a medium-sized airplane, this known fairing is of acceptable dimensions. However, for a large-sized airplane it is necessarily lengthy and bulky, which gives rise to heavy aerodynamic loadings exerted on said fairing in flight. This entails stiffening it, which results in a penalizing increase in mass.

Furthermore, when the wing structure has mobile trailing-edge elements, such as wing flaps, this fairing has itself to be mobile. In this case, for certain flight configurations, the fairing may find itself at least partially in the hot air jet from an engine (the temperature of which may be as high as 700° C.), which means that it then has to be made of heat-resistant materials and designed to withstand these high temperatures and acoustic fatigue. This then results in mass constraints and additional production costs.

SUMMARY OF THE INVENTION

The object of the present invention is to overcome these drawbacks.

To this end, according to the invention, the aircraft wing structure suspension pylon, said wing structure comprising a pressure face, the rear part of which is concave and set back with respect to its front part and said pylon:

being suspended from said wing structure, projecting with respect to said pressure face of the wing structure and being profiled to comprise, between its leading edge and its trailing edge, a section of maximum width; and being equipped with a fairing for reducing the local loss of aerodynamic lift, which:
  is placed in contact with the pressure face of said wing structure and extends heightwise over part of said pylon; and
  extends toward the rear of the wing structure, and continues beyond the trailing edge thereof, in the form of a projecting rear part with an upper surface in aerodynamic continuation of the suction face of said wing structure, is noteworthy in that:
  said maximum-width section of said pylon is arranged at the front of said concave and set-back rear part of the pressure face of the wing structure; and
  said fairing for reducing the local loss in aerodynamic lift:
    is housed, at least over most of its height, in the concavity of said rear part of the pressure face of the wing structure,
    extends toward the rear of the wing structure, widening laterally in the manner of a fan, from said suspension pylon, where it has a width at least approximately equal to said maximum width thereof, as far as the trailing edge of the wing structure, where it has a width at least equal to twice said maximum width, and
    comprises an underside which comes close to said upper surface, in aerodynamic continuation of the suction face of the wing structure so as to give said projecting rear part of said fairing the shape of a blade which tapers toward the rear and ends in an aerodynamic trailing edge, which projects from the trailing edge of the wing structure and extends along the latter over a length corresponding to said width of said fairing at said trailing edge of the wing structure.

Thus, by virtue of the present invention there is obtained a fairing which is flat, has small dimensions in the height direction, but a shape which is spread out along the trailing edge of the wing structure and is able to solve the above-mentioned problems of the known fairing. Such a flat and spread-out shape makes it possible not only to eliminate the problems near the trailing edges of the wing structure and of the suspension pylon, but also to greatly alter the local flow of the air by encouraging the distribution of velocity at the trailing edge of the wing structure. The gain in lift achieved by the fairing according to the present invention is markedly greater than that of the known fairing. In addition, this gain in lift is more spread out across the span, because of the special spread-out shape of the fairing of the invention.

It will be noted that, in order to cancel, or at the very least to minimize, the loss in lift due to the presence of the suspension pylon and to the installation, for example the motive power unit, that it carries, one might be tempted to give said fairing a width (at the trailing edge of the wing structure) which in terms of span covers the entirety of the lift loss zone. However, if this were to be done, this width could be equal to many times the maximum width of the pylon, which would entail said fairing having large dimensions and therefore a great mass. Hence, in practice, the width of the fairing at the trailing edge of the wing structure is the result of a compromise between the gain in lift afforded by said fairing of the invention and the corresponding mass of this fairing.

It will also be noted that the tapered shape of the aerodynamic trailing edge of said fairing makes it possible to considerably reduce the length of the part of the known fairing projecting beyond the trailing edge of the wing structure for a similar order of aerodynamic efficiency. Experience has shown that that the present invention makes it possible to reduce the height of the fairing by about 80% and to reduce the length of said projecting part thereof by about 50%, with respect to this known fairing, for essentially equal aerodynamic efficiency with respect to the risk of airstream detachment at the trailing edge of the pylon and with respect to loss-of-lift problems. Such a reduction in the dimensions therefore makes it possible to avoid the mass and bulkiness drawbacks mentioned hereinabove and, in the case of a mobile fairing near to the hot jet from an engine, makes it possible to reduce the constraints on the design and the kinds of materials to use.

Advantageously, the trailing edge of said projecting rear part has an intermediate part and two lateral parts, said intermediate part being in the aerodynamic continuation of said maximum-width section of said pylon and projecting further, with respect to the trailing edge of the wing structure, than said lateral parts.

Thus, it is this intermediate part which is in the continuation of the suspension pylon, which projects the farthest with respect to the trailing edge of the wing structure so as to limit as far as possible any problems with airstream detachment and loss of lift which are due to the presence of said suspension pylon. For their part, the lateral parts of the trailing edge of the fairing make it possible to increase the gain in lift, by locally extending the chord of the wing structure, over a limited span.

At their opposite end to said intermediate part, said lateral parts of the trailing edge of the projecting rear part may gradually meet the trailing edge of the wing structure and said intermediate part of the trailing edge of the projecting rear part may be rounded and convex, whereas said lateral parts of the trailing edge of the projecting rear part may comprise a concave portion where they meet said intermediate part.

In order to improve the efficiency of the fairing according to the present invention, it has been found that it was advantageous if:

said underside of said fairing has an intermediate rib and two lateral flanks;

said intermediate rib is in the aerodynamic continuation of said maximum-width section of said pylon, ends at the rear in the form of said intermediate trailing edge part and is more in relief, with respect to said rear part of the pressure face of the wing structure, than said lateral flanks; and said lateral flanks gradually connect said intermediate rib to said rear part of said pressure face of the wing structure while at the same time laterally forming said fan and ending at the rear in the form of said lateral parts of the trailing edge of said projecting rear part.

The fairing according to the invention may be symmetric or asymmetric with respect to the longitudinal axis of the foot of said suspension pylon.

Whatever the embodiment of the trailing edge of the fairing, it goes without saying that it is necessary to make sure that the shape of the projecting rear part thereof does not give rise to airstream detachments which would increase drag.

Furthermore, in order to avoid the projecting rear part of the fairing according to the present invention being submerged in the viscous effects of the boundary layer in the vicinity of the trailing edge of the wing structure (which would appreciably reduce the aerodynamic efficiency of said fairing), it is important that, at said trailing edge of the wing structure, the thickness of said fairing be greater than the thickness of the boundary layer of the aerodynamic flow over said wing structure.

BRIEF DESCRIPTION OF THE DRAWINGS

The figures of the appended drawing will make it easy to understand how the invention may be embodied. In these figures, identical references denote similar elements.

DESCRIPTION OF THE PREFERRED EMBODIMENTS

Figure 1:
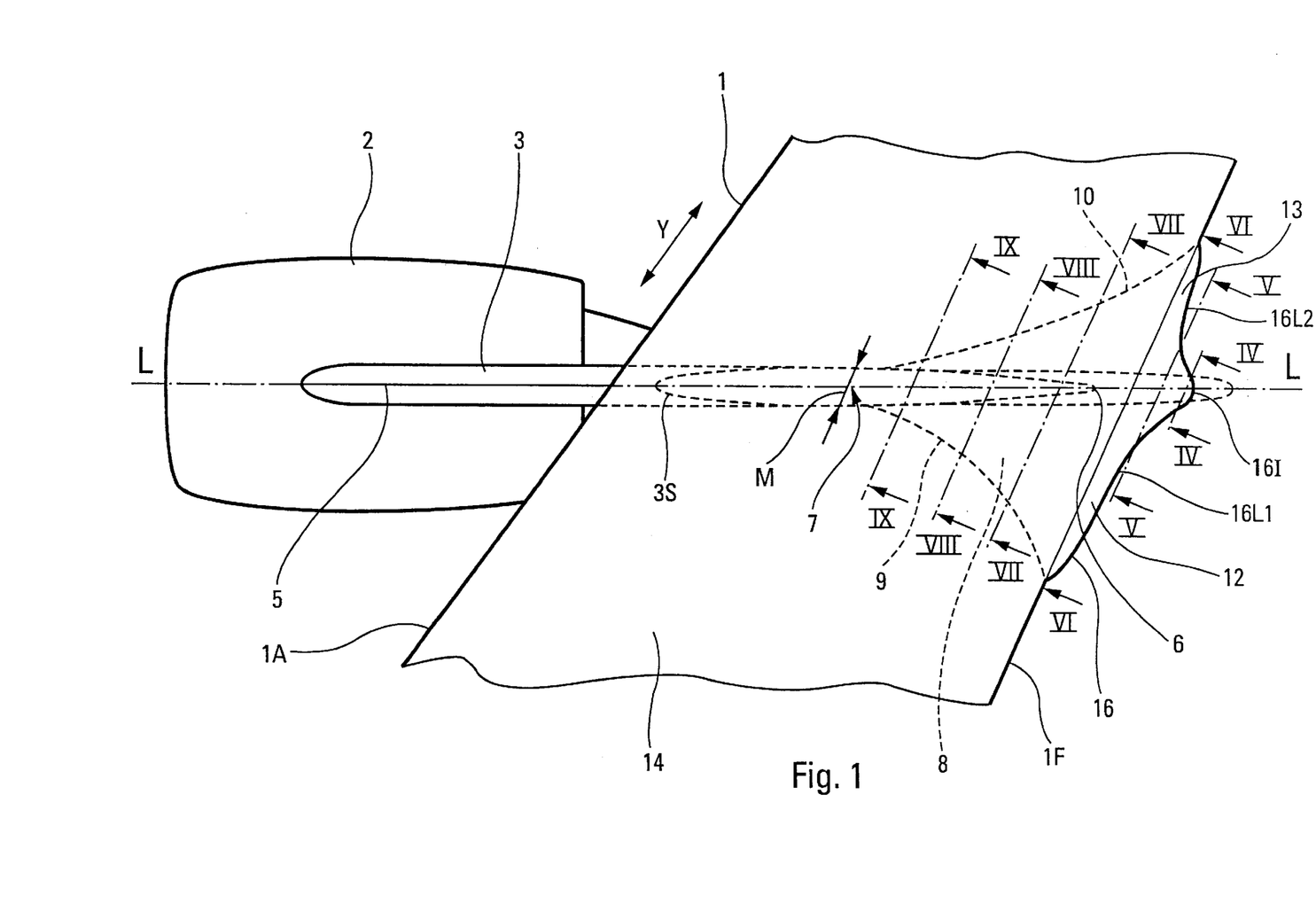
FIGS. 1 and 2 respectively show, in views from above and from below, a schematic example of a suspension pylon according to the present invention, intended to support an engine under the wing structure of an airplane.
Figure 2:
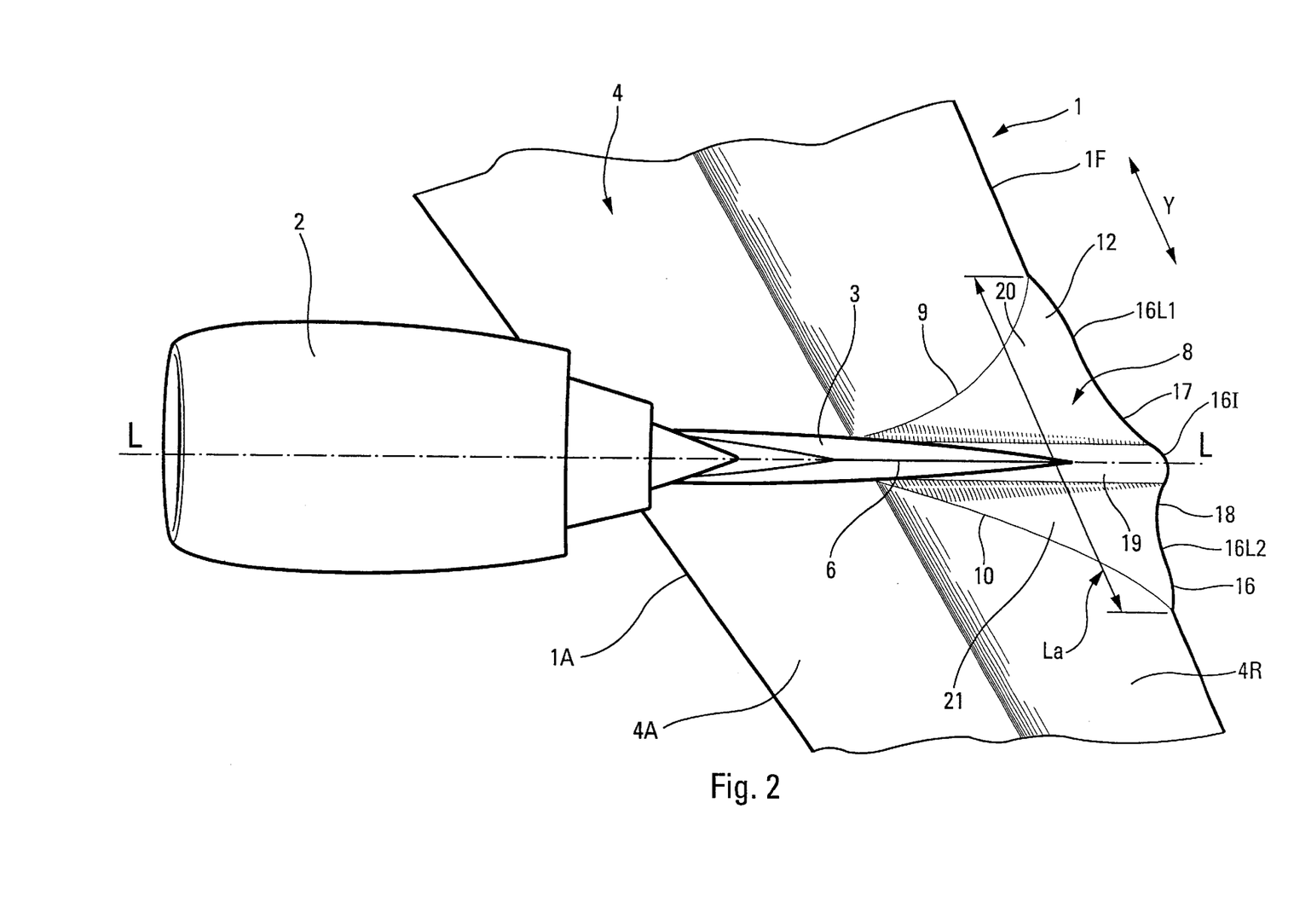
Figure 3:
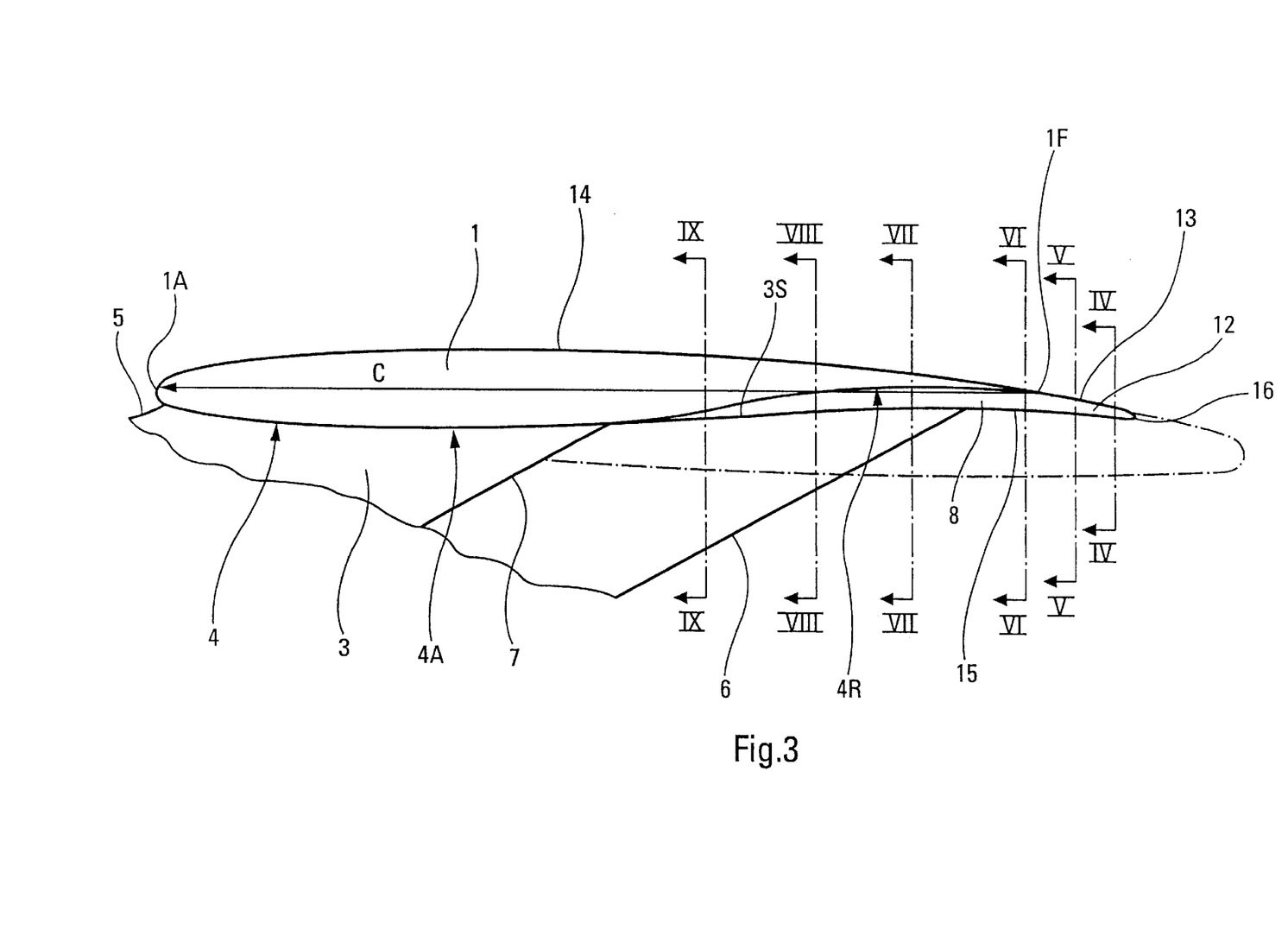
FIG. 3 depicts an enlarged partial side view of the wing structure of said airplane and of the upper part of the suspension pylon of FIGS. 1 and 2.
Figure 4:
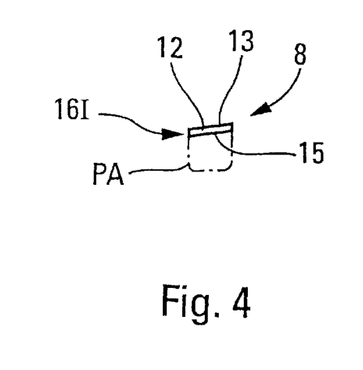
FIGS. 4 to 9 are views in cross section, corresponding respectively to the section lines IV—IV to IX—IX of FIGS. 1 and 3.
Figure 5:
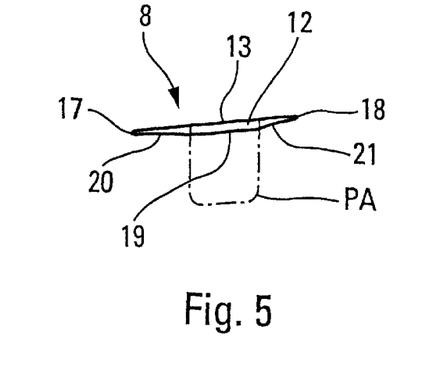
Figure 6:
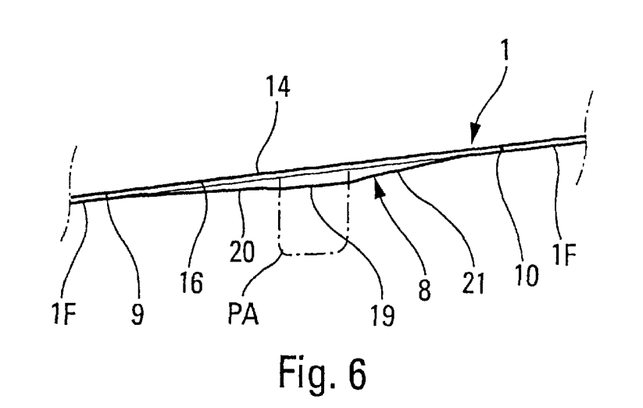
Figure 7:
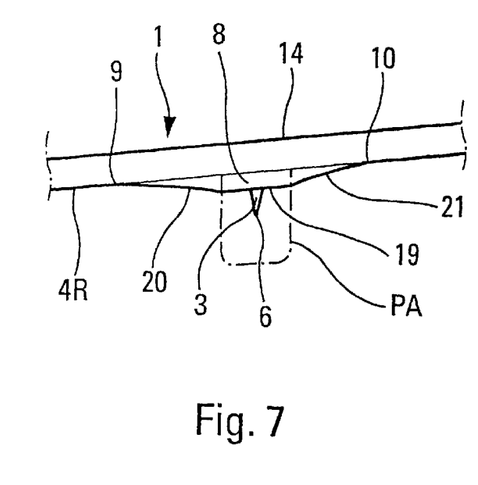
Figure 8:
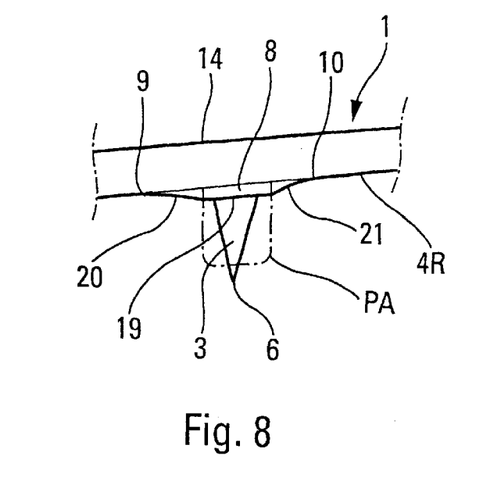
Figure 9:
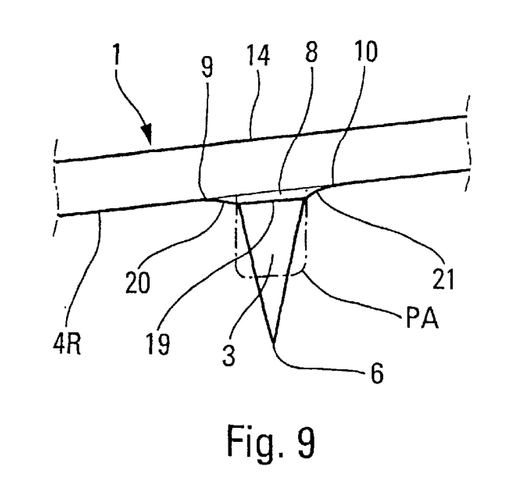

FIGS. 1 and 2 depict a portion of the wing structure 1 of an airplane, in the vicinity of an engine 2 thereof. This engine 2 is suspended from the wing structure 1 by a suspension pylon 3 which projects from the pressure face 4 of the wing structure 1, to which it is connected by the foot of the pylon 3S, of longitudinal axis L—L. As can be seen in FIG. 3, the wing structure 1 comprises a front part (on the same side as the leading edge 1A) which is thick, and a rear part (on the same side as the trailing edge 1F) which is thin, because the pressure face 4 has a rear part 4R which is concave and set back with respect to its front part 4A.

The suspension pylon 3, itself suspended from the wing structure 1 in a known way which has not been depicted, is profiled and comprises a leading edge 5 and a trailing edge 6 and, between these, a section 7 of maximum width M. (The width of the pylon 3 is that dimension thereof which is at least roughly parallel to the wing span Y of the wing structure 1, that is to say orthogonal to the plane of FIG. 3). In the example depicted in the figures, the section 7 is not vertical, but is steeply inclined forward, from the top downward. Moreover, said maximum-width section 7 of the pylon 3 is arranged forward of the concave and set-back rear part 4R of the pressure face 4 of the wing structure 1.

In addition, the suspension pylon 3 is equipped with a fairing 8 (see also FIGS. 4 to 10), intended to reduce the local loss of lift and the local increase in drag which are caused by the pylon 3 and the engine 2. This fairing 8 is flat and arranged in contact with the pressure face 4 of the wing structure 1, extending only over a short part of the height of said pylon 3. More specifically, the fairing 8 is housed, at least for most of its height, in the concavity of the rear part 4R of the pressure face 4 of the wing structure 1.

The flat fairing 8 extends toward the rear of the wing structure 1 and continues beyond the trailing edge 1F thereof in the form of a projecting rear part 12, the topside 13 of which is in the continuation of the suction face 14 of the wing structure 1. The underside 15 of the fairing 8, at least in its rear part, comes close to the topside 13 to give said projecting rear part 12 the shape of a blade which tapers toward the rear and ends in a trailing edge 16, projecting with respect to the trailing edge 1F of the wing structure 1.

Extending toward the rear of the wing structure 1, the flat fairing 8 widens laterally, in the manner of a fantail, from the suspension pylon 3 where its width is at least approximately equal to the maximum width M of the section 7, as far as the trailing edge 1F of the wing structure 1 where it has a width La several times greater than said maximum width M of the suspension pylon 3. Laterally, said flat fairing 8 meets the rear part 4R of the pressure face 4 along diverging lines 9 and 10 leading from said suspension pylon 3 and terminating at the ends of the trailing edge 16 of the projecting rear part 12. Thus, the trailing edge 16 has a length which is equal to the width La of the flat fairing 8 at the trailing edge 1F of the wing structure 1.

Figure 10:
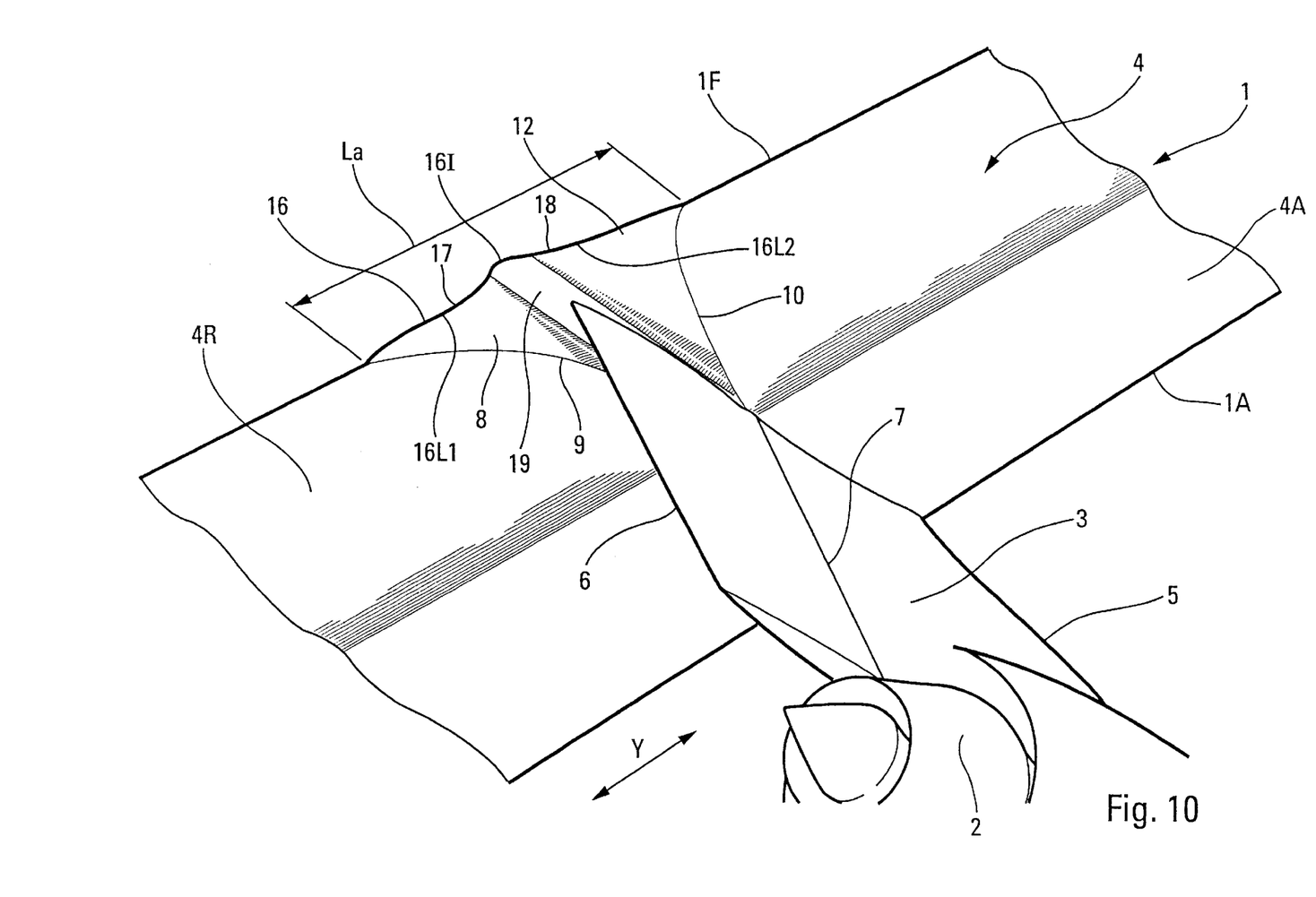
FIG. 10 is a partial view in perspective from the rear and from beneath, of the embodiment of the suspension pylon illustrated in FIGS. 1 to 9.

As can be seen in FIGS. 1, 2 and 10, the trailing edge 16 of the projecting rear part 12 comprises an intermediate part 16I and two lateral parts 16L1 and 16L2. The intermediate part 16I is in the aerodynamic continuation of the section 7 of maximum width M of the suspension pylon 3 and projects further, with respect to the trailing edge 1F of the wing structure 1, than the lateral parts 16L1 and 16L2.

In the embodiment shown in the figures, the trailing edge 16 of the projecting rear part 12 has the approximate shape of an accolade with a rounded and convex intermediate part 16I gradually meeting the trailing edge 1F of the wing structure 1 via said lateral parts 16L1 and 16L2 which exhibit a concave portion 17 or 18 where they meet the intermediate part 16I.

As can best be seen in the cross sections of FIGS. 5 to 9, the underside 15 of the fairing 8 comprises an intermediate rib 19 and two lateral flanks 20 and 21 connected to the rear part 4R of the pressure face 4 by said diverging lines 9 and 10. This intermediate rib 19 is in the aerodynamic continuation of the section 7 of maximum width M and ends at the rear in the form of the intermediate part 16I of the trailing edge 16. By comparison with the rear part 4R of the pressure face 4 of the wing structure 1, the intermediate rib 19 is more in relief than said lateral flanks 20 and 21. These gradually connect the intermediate rib 19 to the rear part 4R of the pressure face 4, while at the same time laterally forming said fantail which is delimited by the diverging lines of connection 9 and 10. The lateral flanks 20 and 21 end at the rear in the form of the lateral parts 16L1 and 16L2 of the trailing edge 16 of the projecting rear part 12.

In the embodiment depicted in the figures, the fairing 8 and its trailing edge 16 are asymmetric with respect to the longitudinal axis L-L of the foot 3S of the pylon 3. In actual fact, the shape of the trailing edge 16 depends on the particular instance and could just as easily be symmetric with respect to said axis L—L.

Thanks to the present invention there is thus obtained a fairing 8 which is particularly flat not very bulky in the height-direction but which is spread out in terms of width. In FIGS. 1 and 3, chain line has been used to depict the outlines of the known fairing PA, which would need to be provided for the wing structure 1, for equivalent aerodynamic efficiency with respect to the risk of airstream detachment at the trailing edge of the pylon and problems of loss of lift.

Figure 11:
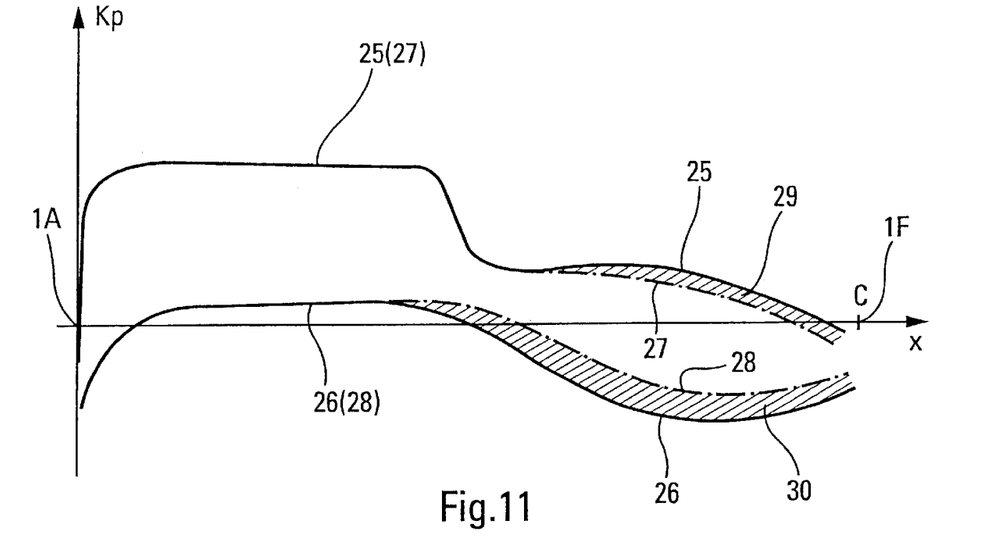
FIGS. 11 and 12 are diagrams illustrating the aerodynamic action of the fairing according to the present invention.

FIG. 11 depicts, as a function of the distance x along the chord C of the profile of the wing structure 1, measured from the leading edge 1A toward the trailing edge 1F, the curve 25 representing the variation in the pressure coefficient Kp on the suction face 14, and the curve 26 representing the variation in said coefficient Kp on the pressure face 4, for the engine 2-pylon 3-wing structure 1 assembly equipped with the fairing 8 described hereinabove. By way of comparison, the same curves 27 and 28 have also been plotted in this figure for said engine 2—pylon 3—wing structure 1 assembly from which said fairing 8 has been omitted. It can easily be seen that, by virtue of the fairing 8 of the invention, the lift of said assembly is increased, in the rear part 4R of the pressure face, in a proportion which corresponds to the sum of the hatched zones 29 and 30 depicted in FIG. 11.

Figure 12:
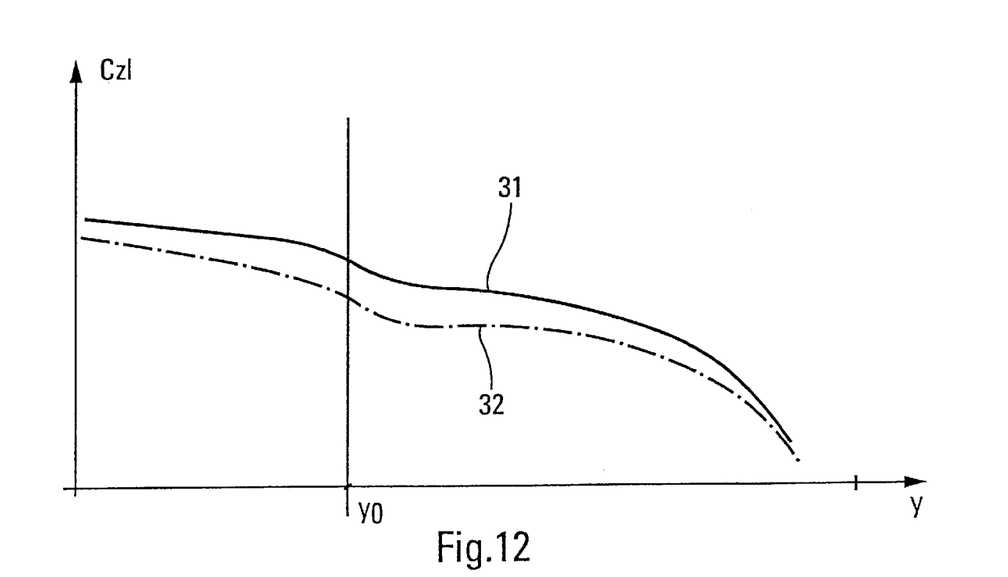

Furthermore, FIG. 12 depicts, as a function of the span Y of the wing structure 1, the variation in the local coefficient of lift Czl in line with the motive power installation on said wing structure, the position of the engine 2 and of the suspension pylon 3 corresponding to the value Yo of said span Y. The curve 31 corresponds to the engine 2—pylon 3-wing structure 1 assembly fitted with the fairing 8 described hereinabove, while the curve 32 corresponds to the same engine 2—pylon 3—wing structure 1 assembly, from which said fairing 8 has been omitted. The significance of the gain in lift afforded by the fairing 8 of the present invention can thus be assessed.

What is claimed is:

1. An aircraft wing structure suspension pylon, said wing structure comprising a pressure face, the rear part of which is concave and set back with respect to the front part of said pressure face, said pylon:

being suspended from said wing structure, projecting with respect to said pressure face of the wing structure, having a leading edge and a trailing edge and being profiled to comprise, between said leading edge and said trailing edge, a section of maximum width; which is arranged at the front of said concave and set-back rear part of the pressure face of the wing structure; and being equipped with a fairing for reducing the local loss of aerodynamic lift, which:

is placed in contact with the pressure face of said wing structure and extends heightwise over part of said pylon and is housed, at least over most of the height of said fairing, in the concavity of said rear of the pressure face of the wing structure;

extends toward the rear of the wing structure, and continues beyond the trailing edge thereof, in the form of a projecting rear part with an upper surface in aerodynamic continuation of the suction face of said wing structure, said fairing being arcuate in shape and widening laterally, and extending from said suspension pylon, where said fairing has a width at least approximately equal to said maximum width of said suspension pylon, as far as the trailing edge of the wing structure, where said fairing has a width at least equal to twice said maximum width of said suspension pylon; and comprises an underside which comes close to said upper surface, in aerodynamic continuation of the suction face of the wing structure so as to give said projecting rear part of the wing structure so as to give said projecting rear part of said fairing the shape of a blade which tapers toward the rear and ends in an aerodynamic trailing edge, which projects from the trailing edge of the wing structure and extends along the latter over a length corresponding to said width of said fairing at said trailing edge of the wing structure, the trailing edge of said projecting rear part having an intermediate part and two lateral parts, said intermediate part being in the aerodynamic continuation of said maximum-width section of said pylon and projecting further, with respect to the trailing edge of the wing structure, than said lateral parts.

2. The suspension pylon as claimed in claim 1, wherein said lateral parts of the trailing edge of the projecting rear part has an end which is opposite to said intermediate part and at which said lateral parts of the trailing edge of the projecting rear part gradually meet the trailing edge of the wing structure.

3. The suspension pylon as claimed in claim 1, wherein said intermediate part of the trailing edge of the projecting rear part is rounded and convex.

4. The suspension pylon as claimed in claim 1, wherein said lateral parts of the trailing edge of the projecting rear part comprise a concave portion where said lateral parts meet said intermediate part.

5. The suspension pylon as claimed in claim 1, wherein:
   said underside of said fairing has an intermediate rib and two lateral flakes;
   said intermediate rib is in the aerodynamic continuation of said maximum-width section of said pylon, ends at the rear in the form of said intermediate trailing edge part and is more in relief, with respect to said rear part of the pressure face of the wing structure, than said lateral flanks; and
   said lateral flanks gradually connect said intermediate rib to said rear part of said pressure face of the wing structure while at the same time laterally forming said fan and ending at the rear in the form of said lateral parts of the trailing edge of said projecting rear part.

6. The suspension pylon as claimed in claim 1, wherein said fairing is symmetric with respect to the longitudinal axis of the foot of said pylon.

7. The suspension pylon as claimed in claim 1, wherein said fairing is symmetric with respect to the longitudinal axis of the foot of said pylon.

\* \* \* \* \*